United States Patent
Powell

(10) Patent No.: US 7,624,964 B2
(45) Date of Patent: Dec. 1, 2009

(54) GAS VALVE WITH PROPORTIONAL OUTPUT

(75) Inventor: Simon Powell, Royston (GB)

(73) Assignee: PBT (IP) Limited (GB)

( * ) Notice: Subject to any disclaimer, the term of this patent is extended or adjusted under 35 U.S.C. 154(b) by 407 days.

(21) Appl. No.: 10/530,362

(22) PCT Filed: Oct. 6, 2003

(86) PCT No.: PCT/GB03/04437

§ 371 (c)(1),
(2), (4) Date: Aug. 26, 2005

(87) PCT Pub. No.: WO2004/031630

PCT Pub. Date: Apr. 15, 2004

(65) Prior Publication Data

US 2006/0097216 A1 May 11, 2006

(30) Foreign Application Priority Data

Oct. 4, 2002 (GB) ................................. 0223064.7
Feb. 28, 2003 (GB) ................................. 0304673.7

(51) Int. Cl.
*F16K 1/00* (2006.01)
*F16K 15/00* (2006.01)
(52) U.S. Cl. .................... 251/333; 251/129.04
(58) Field of Classification Search ............ 251/129.04, 251/129.06, 11, 333
See application file for complete search history.

(56) References Cited

U.S. PATENT DOCUMENTS

| | | | |
|---|---|---|---|
| 2,901,623 A * | 8/1959 | Wouters ................. | 251/129.06 |
| 3,951,168 A | 4/1976 | Roberts ................. | 137/625.28 |
| 4,089,348 A | 5/1978 | Yoshida et al. .............. | 137/856 |
| 4,492,360 A * | 1/1985 | Lee et al. ................ | 251/129.06 |
| 4,621,945 A | 11/1986 | Schafer et al. ................. | 405/39 |
| 4,705,059 A * | 11/1987 | Lecerf et al. ................... | 137/82 |
| 5,020,567 A | 6/1991 | Proulx ......................... | 137/315 |
| 5,029,805 A * | 7/1991 | Albarda et al. ................. | 251/11 |
| 5,040,567 A * | 8/1991 | Nestler et al. .......... | 137/625.44 |
| 5,139,226 A * | 8/1992 | Baldwin et al. .......... | 251/129.2 |
| 5,323,999 A * | 6/1994 | Bonne et al. ................... | 251/11 |
| 5,343,894 A | 9/1994 | Frisch et al. ........... | 137/625.65 |
| 5,785,295 A * | 7/1998 | Tsai ............................ | 251/11 |
| 5,975,485 A * | 11/1999 | Tsai et al. ..................... | 251/11 |

(Continued)

FOREIGN PATENT DOCUMENTS

| BE | 1 004 094 A | 9/1992 |
|---|---|---|
| DE | 24 36 499 A | 2/1976 |
| EP | 0 915 277 A | 5/1999 |
| GB | 1 498 178 A | 1/1978 |

*Primary Examiner*—John K Fristoe, Jr.
(74) *Attorney, Agent, or Firm*—Renner, Kenner, Greive, Bobak, Taylor & Weber

(57) ABSTRACT

A valve for controlling fluid flow comprising a body (100) provided with a fluid passageway having an inlet (10) an outlet (90), a valve member for inhibiting fluid flow through the passageway, and means for moving the valve member (40, 50) so as to provide for controlled flow of fluid from the inlet to the outlet, wherein the valve member is in the form of a blade, one end of which is mounted at a location (41, 51) remote from the passageway; and wherein the means (60) of moving the valve member is arranged to act on the other end of the blade whereby to control fluid flow through the passageway.

6 Claims, 2 Drawing Sheets

U.S. PATENT DOCUMENTS

| | | | |
|---|---|---|---|
| 6,003,833 A * | 12/1999 | Tasi et al. | 251/11 |
| 6,003,836 A | 12/1999 | Cewers | 251/129.06 |
| 6,017,016 A * | 1/2000 | Jackson | 251/129.06 |
| 6,149,123 A * | 11/2000 | Harris et al. | 251/11 |
| 6,164,621 A * | 12/2000 | Bouchard et al. | 251/129.06 |
| 6,340,149 B1 * | 1/2002 | Biegelsen et al. | 251/129.06 |
| 6,581,638 B2 * | 6/2003 | Frisch et al. | 137/596.17 |
| 6,663,078 B1 * | 12/2003 | Stoll et al. | 251/129.06 |
| 6,705,347 B2 * | 3/2004 | Itzhaky | 137/625.65 |
| 7,309,056 B2 * | 12/2007 | Harris et al. | 251/11 |
| 2002/0008218 A1 * | 1/2002 | Weinmann et al. | 251/129.06 |
| 2003/0222236 A1 * | 12/2003 | Eberhardt et al. | 251/129.06 |
| 2005/0133751 A1 * | 6/2005 | Seeley et al. | 251/129.06 |

* cited by examiner

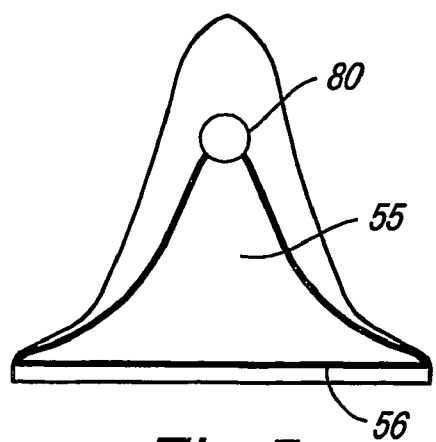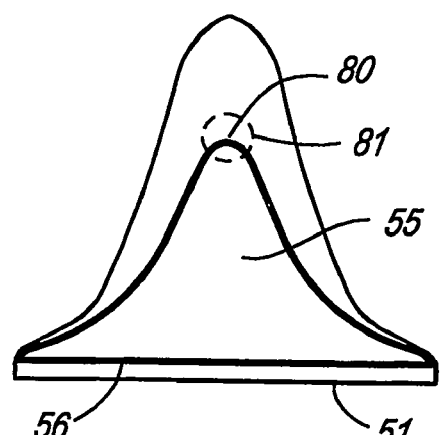
Fig. 5    Fig. 6
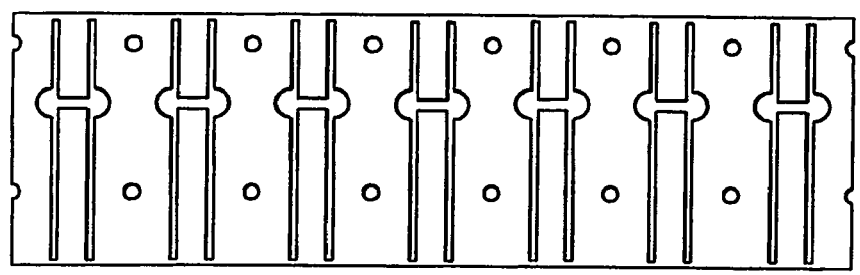
Fig. 7
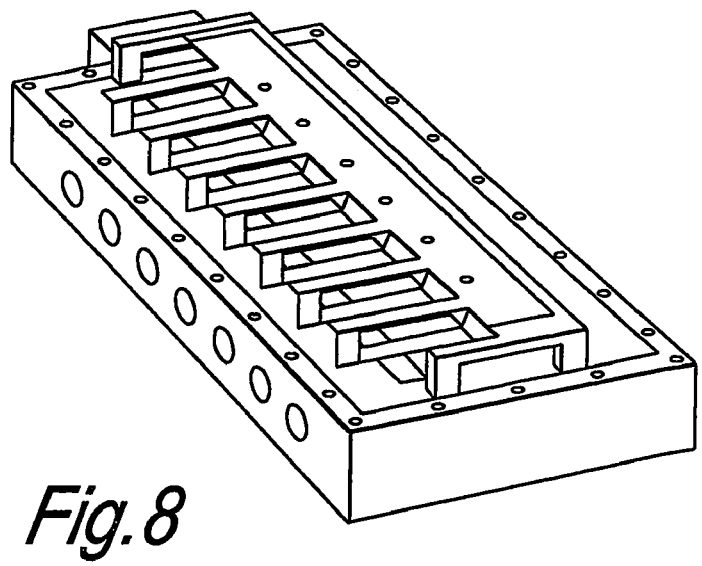
Fig. 8

GAS VALVE WITH PROPORTIONAL OUTPUT

The present invention relates to the control of low pressure combustible gas flow.

Indexing mechanisms that amplify piezo electric actuator motion, as disclosed in UK Patent Application GB0030263.8 and GB0011350.3 can be used to provide gradual opening of a face seal, but the cost of such systems is prohibitive when compared to a manual solution.

Poppet valves, where the seal is pressed onto an orifice and lifted off are commonly used in such applications, but proportional control of such devices is hampered by the nature of their opening. In a situation where the incoming gas pressure is resisted by a spring and the actuator pulls the spring off, the forces required are increased for the actuator by the spring's sealing force and additionally by its spring rate. When the valve is closed by the gas pressure the pressure differential collapses as the seal begins to open, and the actuator then overshoots. Solutions such as motors with worm drives can solve this problem, but at a cost that is prohibitive.

For cost reasons it is desirable to make use of simple parts with low energy consumption and this has caused piezoelectric actuators to be considered. However, such actuators encounter problems where the movement required is large. When dealing with gas valves, the movement required of the valve member V is determined by the diameter D of the inlet orifice. Smooth flow is obtained only when the valve member V is a minimum of 25% of the diameter above the orifice, as shown in FIG. 1. This is because the area of a cylinder diameter D and 25% of D high is equivalent to the area of the hole D, so the opening does not constitute a restriction.

Gas control valves are required to have a pressure drop of around 1 millibar when passing their maximum flow rate, although this varies slightly with different specifications. In order to achieve such a low pressure drop it is necessary for the orifice to be roughly the same size as the incoming pipe. In most cooker installations the pipe has an internal diameter of 4 mm, so the valve must lift at least 1 mm clear of the orifice, and preferably more. This amount of movement can only be achieved from a piezo-ceramic bender, not a stack, but only a limited range of designs offer such a movement at a reasonable cost.

Another factor is that the force available from a piezo-electric bender reduces linearly with the displacement, as shown in FIG. 2. In order to maintain a useable level of force the assembly must work within 50% of the force and 50% of the unloaded deflection, as shown by the shaded box of FIG. 2.

From the above information it can be seen that working with a bottom pressure system is unattractive, because the closure spring will double the work needed from the actuator, thus reducing by half the movement which is already close to the practical limits. Achieving the level of movement from the bender will require a system of relatively low stiffness. If the system is of low stiffness the process of opening against the gas pressure must resist the impulse caused by the collapse as the valve opens. If the actuator is flexible enough to give the motion required it tends to pull off the orifice and enter into a non-controlled oscillation that makes it impossible to accurately regulate the gas flow.

It is not desirable to use the actuator itself as the sealing means because within the nature of the piezoelectric materials is a level of hysteresis that will prevent the blade forming a flat seal after operation.

It is desirable to have a means of opening top pressure valves that prevents the unregulated oscillation whilst also permitting the full range of actuator motion to be used.

The present invention provides a valve for controlling fluid flow comprising a body provided with a fluid passageway having an inlet and an outlet, a flexible valve member for inhibiting fluid flow through the passageway, and means for moving the valve member so as to provide for controlled flow of fluid from the inlet to the outlet, wherein the valve member is in the form of a resilient blade which is pivotable abut an axis remote from the passageway.

Preferably, the blade is formed to provide the desired force/displacement characteristics.

In a preferred embodiment, the means for moving the valve member is a piezo-electric actuator. Also, the valve may be provided with a plurality of inputs each provided with its own valve member. The characteristics of the valve members need not be the same in this case, but preferably a single actuator is used to operate the two valve members.

Further, a plurality of valves can be located side by side in a valve assembly which permits the assembly to be constructed from a number of layers.

In order that the present invention be more readily understood, an embodiment will now be described by way of example with reference to the accompanying drawings, in which:

FIG. 5 shows a modification of a part of the valve shown in FIG. 3;

FIG. 6 shows a detailed modification to the arrangement shown in FIG. 5;

FIG. 7 shows a top plan view of an array of valve members which can be used with the present invention; and FIG. 8 shows a perspective view of a complete valve assembly of a plurality of valves, each as represented by FIG. 4.

Figure 1:
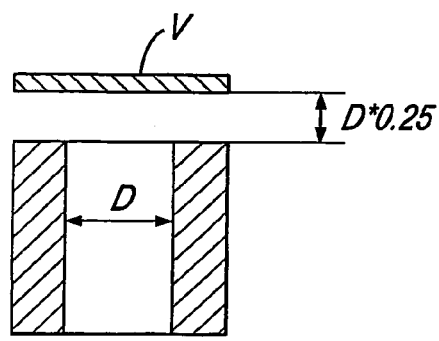
FIG. 1 shows a diagram to explain the basic principles behind the present invention.
Figure 2:
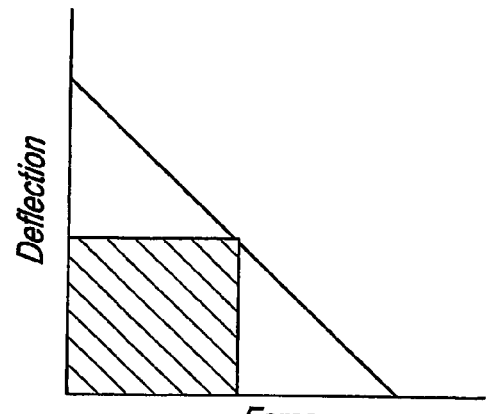
FIG. 2 shows a further diagram to explain the basic principles behind the present invention.
Figure 3:
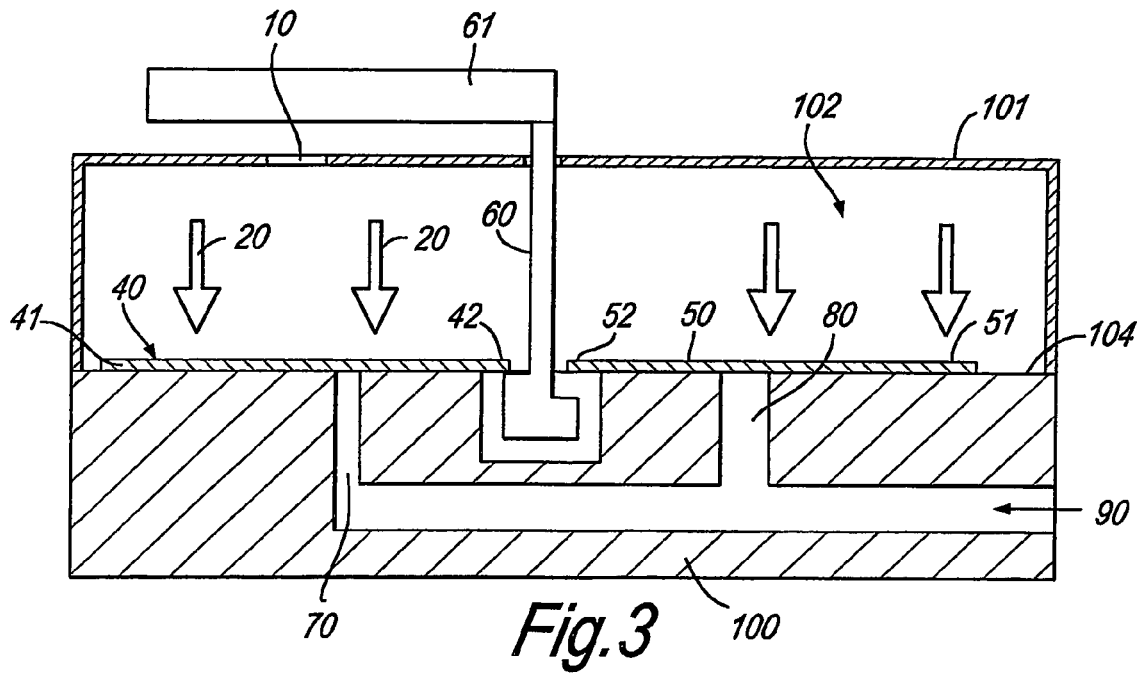
FIG. 3 shows a diagrammatic sectional side view of a part of a valve according to an embodiment of the present invention.

According to the embodiment of the present invention shown in FIG. 3, a gas valve comprises a main valve body 100 provided with an outlet 90 and a cover member 101 sealingly connected to the valve body 100. The cover member 101 is provided with an inlet 10 arranged to be connected to a source of gas and forms a chamber 102 within the valve. Gas flow between the inlet 10 and outlet 90 is controlled my means of one or more valve members in the form of blades 40,50 which are arranged to seal inlets to passageways 70,80 in the main valve body 100 which communicate with the outlet 90.

The or each valve member blade will be described in more detail later but is moved by means of a lifting member 60 connected to a suitable actuator 61. The preferred form of actuator is a piezo-electric actuator such as one sold under the trade name Servocell by PBT Limited of Harlow, England. Other actuators may be utilised such as ones using a magneto-strictive, electro-strictive or other active material that can be formed into a bender configuration. For low speed operation, the mechanism may also be operated by a thermal bimetal.

As shown in FIG. 3, the actuator 61 is located outside the valve and the lifting member 60 projects through the cover 101. This of course requires the opening through the cover to form a sliding seal with the lifting member 60. Depending on the fluid involved, it might be possible to locate the actuator 61 within the valve itself and thus obviate the need for a sealed opening. The final design has no separate chamber for the actuator, because the actuator is coated in a suitable protective layer and has upon its surface conducting films that prevent sparks in the event of actuator fracture.

Turning now to the blades 40,50, each is shown as being mounted on the top surface 104 of the body 100 at one end 41,51 so that the other end 42,52 can be lifted or peeled by action of the lifting member 60 to open the inlets to the or each passageway 70,80. Mounting may be by clamping, welding or bonding and, as described later, it may be preferable to permit some limited movement of the ends 41,51 in order to achieve the desired amount of sealing.

Figure 4A:
FIGS. 4a to 4c show plan views of three different shapes of valve member useful with the present invention.
Figure 4B:
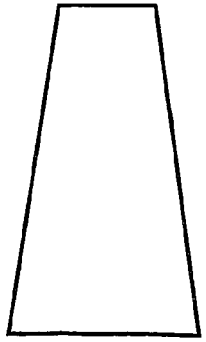
Figure 4C:
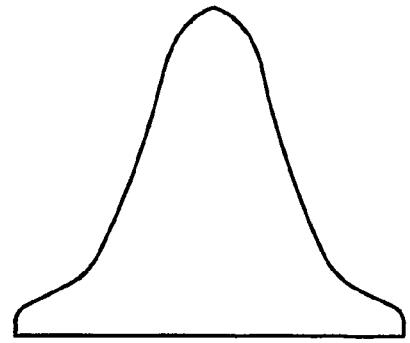

The blades 40,50 are in the form of a thin blade of suitable dimensions and finish to form a gas-tight seal when top pressure of 20 mBar is applied. The blade or blades are preferably of metal with a desired degree of resilience. A number of blade shapes are suited to this application. A simple cantilever, a constant stress beam or a convolute that changes its stiffness geometrically as it opens are examples of such a blade. These fundamental beam shapes are shown in FIG. 4 by way of illustration only, with FIG. 4*a* showing a simple cantilever, FIG. 4*b* showing a constant stress beam and FIG. 4*c* showing a geometric progression convolute.

The shapes of FIG. 4 can be modified to have increasing or decreasing stiffness by the introduction of cutouts and other features.

The blade (40) forms a bypass blade which covers the bypass channel (70) that permits a restricted amount of gas to flow to the outlet of the valve (90), giving a controlled low-level flame suitable for pilot lights and simmer functions. The blade (50) forms a main flow blade that covers the main channel (80) that provides the full flow characteristic of the valve. If adequate feedback is provided in the form of a pressure sensing system, it is possible for the pilot and main burner functions to be delivered from a single orifice and blade arrangement.

The force required to lift the blade from the sealed condition is defined by the equation:

$$F = S1 + (Sxd) + (PxA)$$

Where
S1 is the initial compression applied by the seal blade;
S is the spring rate of the seal blade;
d is the distance needed to overcome any compliance in the seal;
P is the gas pressure difference between the valve and the outlet;
A is the area of the orifice being opened.

The same equation applies throughout the opening action.

The phenomenon of uncontrolled oscillation is reduced by having sufficient stiffness in a simple cantilever, but preferably the blade is of such a form as to rapidly increase in stiffness as the orifice is opened. The deflection of a beam is determined by the equation:

$$d = Wl^3 / 3EI$$

Where
d is the deflection
W is the load
l is the length of the cantilever
E is the Young's Modulus of the material
I is the second moment of inertial of the section For a simple beam the second moment of inertia is defined by $$I = bd^3 / 12$$

Where b is the width
d is the beam thickness

If the width of the beam changes as a geometric progression the relative deflection will change as a linear inverse of this value. In the concept shown in FIG. 3*c* of the part becomes increasingly stiff to move. In FIG. 5 the position of the opening to the passageway (80) is shown relative to the beam shape. When the operating pressure drop is higher it may be desirable to increase the rate of stiffness change, and to do this the value d can be changed, because this is a cubic function. This is achieved by the introduction of an auxiliary blade (55) that is shown in FIG. 5 and which is mounted along its edge 56. The opening is firstly uncovered by the flexible blade and, as the pressure differential collapses, the oscillation is damped by the stiffer component.

It has been found advantageous when using the construction as shown in FIG. 5 to modify the overall construction so that the inlet to the passageway 80 is provided with a resilient sealing surface such as would be present with an O-ring seal 81. this is shown in detail in FIG. 6.

Further, the flexible blade 50 is loosely mounted at its mounting edge 51 so as to permit limited vertical movement (as viewed in FIG. 3) which allows the blade 50 to seal against the O-ring 81. The auxiliary blade 55 is arranged to make contact with the flexible blade within the area of the opening to the passageway 80. Preferably, this is effectively point contact at the opening. As with the earlier embodiments, the shapes of the flexible blade and the auxiliary blade 55 can be chosen to provide the desired valve characteristics.

In use, the passageway 80 is opened by activating the actuator 61 to lift the end 52 of the blade 50 against the resilient force of the blade 50 and the auxiliary blade 55 as well as the gas pressure. The passageway is closed due to the resilience of the blade 50, the force exerted by the auxiliary blade 55 and the gas pressure. The seal is maintained by these forces as well as a venturi effect.

The nature of the valve function is conveniently suited to the fabrication of the components in layers, permitting the replication of the basic construction as a multiple-output system. FIG. 7 shows an array of 7 valve blades formed from a single sheet of material. The array can be any suitable multiple, seven being sufficient for four hobs, a grill and two ovens.

The use of a piezo electric bender actuator permits the actuators to be made as a single part or, if preferred, a multiplicity of single acting devices. FIG. 8 shows a complete valve assembly having its actuators formed as a single array.

The arrangements shown in FIGS. 7 and 8 can be modified to utilise the construction described in relation to FIG. 6 as the basic arrangement shown in FIG. 4.

Through the above and similar constructions can be achieved a proportional electronic valve that uses low-force, high movement actuators to work against a top pressure in the region 20-200 mBar with the control of the critical opening and restriction zones to prevent sudden opening and thus uncontrolled fluctuation in flow.

The invention claimed is:

1. A valve for controlling fluid flow comprising a body provided with fluid passageways and having an inlet and an outlet such that more than one of said passageways lead to said outlet, the valve comprising one or more valve members for inhibiting fluid flow through the passageways, and means for moving the one or more valve members so as to provide for controlled flow of fluid from the inlet to the outlet by moving a lifting member to open one or more of said passageways, wherein one or more of each of the valve members is in the form of a flexible blade, one end of which is mounted at a location remote from the passageways; and wherein the means of moving the one or more of the valve members is arranged to act on the other end of the blade whereby to control fluid flow through the passageway, and a sealing member provided around the periphery of the inlet, the blade having a degree of stiffness such that it provides a force tending to keep the blade in contact with the sealing member.

2. A valve according to claim 1, wherein the blade is shaped so as to provide the desired stiffness as it is moved by the moving means.

3. A valve according to claim 2, wherein the blade is mounted at said one end so as to provide a limited amount of movement in the direction of movement.

4. A valve according to claim 3, wherein an auxiliary member is located over the flexible blade and makes point contact with the blade within the confines of the periphery of an inlet to the passageway.

5. A valve according to claim 4, wherein the auxiliary member is in the form of a blade.

6. A valve according to claim 5, wherein the sealing member is provided in the form of an O-ring.

* * * * *